United States Patent
Wilson et al.

(10) Patent No.: US 9,332,054 B2
(45) Date of Patent: May 3, 2016

(54) CAPTIVE PORTAL REDIRECTION USING DISPLAY LAYOUT INFORMATION

(75) Inventors: David Wilson, Mountain View, CA (US); Cameron Esdaile, San Francisco, CA (US); Deepinder Setia, San Ramon, CA (US); Pradeep Iyer, Cupertino, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 392 days.

(21) Appl. No.: 13/439,730

(22) Filed: Apr. 4, 2012

(65) Prior Publication Data

US 2013/0268666 A1    Oct. 10, 2013

(51) Int. Cl.
*G06F 15/173* (2006.01)
*H04L 29/08* (2006.01)
*H04L 29/06* (2006.01)

(52) U.S. Cl.
CPC ............... *H04L 67/02* (2013.01); *H04L 63/08* (2013.01); *H04L 63/168* (2013.01)

(58) Field of Classification Search
CPC .................................................. G06F 15/173
USPC .................................... 709/225, 217; 715/741
See application file for complete search history.

(56) References Cited

U.S. PATENT DOCUMENTS

| 7,505,434 | B1 | 3/2009 | Backes | |
|---|---|---|---|---|
| 7,913,294 | B1 | 3/2011 | Maufer et al. | |
| 7,971,621 | B2 | 7/2011 | Rogalla et al. | |
| 2003/0229665 | A1* | 12/2003 | Ryman | 709/203 |
| 2007/0100967 | A1* | 5/2007 | Smith et al. | 709/219 |
| 2007/0214265 | A1* | 9/2007 | Zampiello et al. | 709/226 |
| 2010/0095359 | A1* | 4/2010 | Gordon | 726/6 |
| 2010/0235513 | A1* | 9/2010 | Baffier et al. | 709/226 |
| 2010/0263022 | A1* | 10/2010 | Wynn et al. | 726/3 |
| 2011/0138074 | A1* | 6/2011 | Onda et al. | 709/245 |
| 2011/0314149 | A1* | 12/2011 | Manning et al. | 709/224 |
| 2012/0210011 | A1* | 8/2012 | Liu et al. | 709/229 |
| 2013/0262651 | A1 | 10/2013 | Shah et al. | |

OTHER PUBLICATIONS

Notice of Allowance of Mar. 30, 2015 for U.S. Appl. No. 14/018,129, 6 pages.

* cited by examiner

*Primary Examiner* — Bharat N Barot
*Assistant Examiner* — Marie Georges Henry
(74) *Attorney, Agent, or Firm* — Mannava & Kang, P.C.

(57) ABSTRACT

According to one embodiment of the invention, a method for controlling access to a network by a network device comprises returning a message prompting connectivity to a captive portal that is different from a HTTP Source Code redirect. The message is an HTML document such as a frameset.

24 Claims, 5 Drawing Sheets

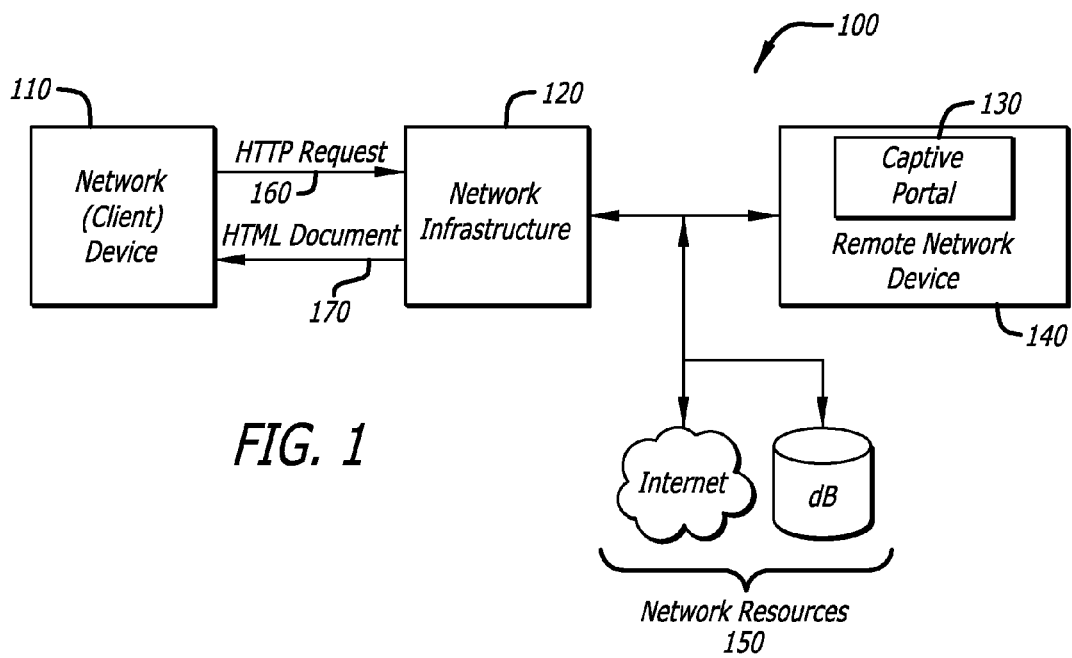

CAPTIVE PORTAL REDIRECTION USING DISPLAY LAYOUT INFORMATION

FIELD

Embodiments of the present disclosure relate to the field of wireless communications, and in particular, a network device that is adapted to establish connectivity between the network device and an external captive portal without reliance on Hypertext Transfer Protocol (HTTP) Status Code redirects.

BACKGROUND

Recently, wireless networks are being adapted to support "Bring-Your-Own-Device" (BYOD) environments, where all users are able to access a targeted wireless network through their personal devices, such as laptop computers, tablets, or smartphones for example. As a result, the number of devices per network user has grown from a one-to-one relationship to a one-to-many relationship as a network user may simultaneously or interchangeably connect multiple devices to a particular network.

Granting enterprise access to personal devices has direct implications on security and network control. Security challenges range from understanding who and what is connected to the network to ensuring that those connected, unauthenticated devices have restricted for access to network resources. One way to handle such security issues is through the use of a captive portal.

"Captive portal" is a technique that forces a HTTP client on a network to display a special web page (usually for authentication purposes) before normal access to the Internet or another network resource is permitted. Generally, all messages from a client in a non-authenticated state are intercepted, regardless of the targeted address or port. Once the user opens a browser and tries to access the Internet through a HTTP Request message (e.g., HTTP GET Request), this prompts a HTTP redirect, namely a response is returned with a status code (e.g., 30x) that induces the browser to access another domain as shown in Table 1.

TABLE 1

| HTTP Client | Redirecting Component |
|---|---|
| GET /index.html HTTP/1.1<br>Host: www.domain1.com | HTTP/1.1 302 Found<br>Location:<br>http://www.domain2.com/ex/ |

For instance, a HTTP Status Code 302 redirect is a temporarily redirect of access from one domain (e.g., www.domain1.com) to another domain (e.g., wwww.domain2.com). At that time, the browser is redirected to a web page at the second domain (www.domain2.com) which may require authentication and/or payment, or simply display an acceptable use policy and require the user to agree.

Hence, while it is important to properly route communications from the devices in a non-authenticated state to an external captive portal, in some cases, HTTP Status Code redirects may not be desired.

BRIEF DESCRIPTION OF THE DRAWINGS

Embodiments of the present disclosure are illustrated by way of example, and not by way of limitation, in the figures of the accompanying drawings and in which:

FIG. 1 is a general block diagram of a network with port-based network access control that supports access to external captive portal.

FIG. 2A is an exemplary embodiment of the network of FIG. 1 operating as a wireless local area network (WLAN).

FIG. 2B is an exemplary embodiment of the network of FIG. 1 operating as a local area network (LAN) supporting wired connectivity.

DETAILED DESCRIPTION

Figure 3:
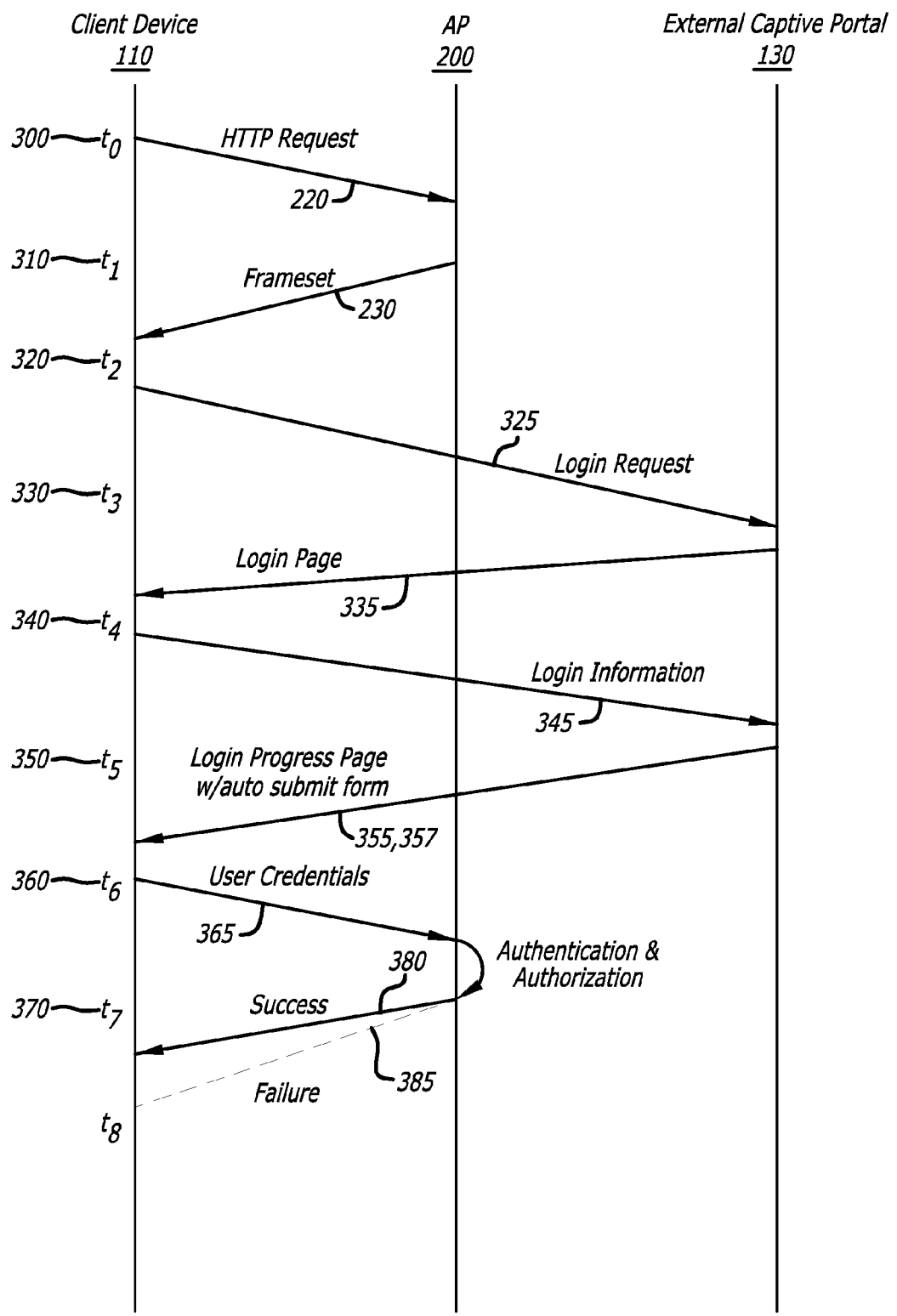
FIG. 3 is an exemplary sequence diagram of communications between a client device, network infrastructure such as an access point (AP) and captive portal of FIG. 1.

In the following description, several specific details are presented to provide a thorough understanding of the invention. One aspect of the disclosure is to avoid Hypertext Transfer Protocol (HTTP) Status Code redirects by a network device, such as an access point (AP) for example. Instead, the network device provides signaling that causes an unauthenticated client device to establish communications with an external captive portal during data fetch operations.

More specifically, upon detecting an incoming HTTP Request message from a client device operating in a non-authenticated state, a network device (e.g., an AP with transparent HTTP proxy functionality) returns a response message to that client device. The response message comprises display layout information for a browser window, where a portion of the display layout information is configured to prompt the client device to access the external captive portal when retrieving content to populate its browser window.

As a result, the network device avoids the use of HTTP Status Code redirects by returning display layout information, such as a Hypertext Markup Language (HTML) frameset for example. The HTML frameset features a frame element that is coded to prompt the client device to access the external captive portal in lieu of accessing content from a web page normally identified by frame tags.

One skilled in the relevant art may recognize, however, that the concepts and techniques disclosed herein can be practiced without certain details such as the exclusion of one or more operations, certain logic, or the like.

Herein, certain terminology is used to describe features for embodiments of the disclosure. For example, the term "network device" generally refers to any device that includes logic adapted to communicate with a network and/or process information related to such communications. Different categories of network devices may include, but are not limited or restricted to (1) a client device being any consumer electronics with network connectivity (e.g., tablet; laptop; desktop;

netbook; television; set-top box; video gaming control; mobile handset with cellular and/or wireless connectivity such as a smartphone, personal digital assistant "PDA"; etc.); (2) an access point; (3) a data transfer device (e.g., network switch, router, controller, brouter, etc.); (4) an authentication server; or the like.

It is contemplated that a network device comprises hardware logic, which includes one or more of the following: (i) processing circuitry (e.g., a controller, a processor, a programmable gate array, an application specific integrated circuit, etc.); (ii) one or more communication interfaces such as radios (e.g., component that handles the wireless data transmission/reception) and/or physical connectors to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Additionally, the term "logic" is generally defined as hardware and/or software. As hardware, logic may include processing circuitry, semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "interconnect" is broadly defined as a logical or physical communication path such as, for instance, electrical wire, optical fiber, cable, bus trace, or a wireless channel using infrared, radio frequency (RF), or any other wireless signaling mechanism. The term "message" constitutes any grouping of data in prescribed format such as a packet, a frame, an Asynchronous Transfer Mode (ATM) cell, an HTML document, or the like.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, operations, steps or acts are in some way inherently mutually exclusive.

Certain details are set forth below in order to provide a thorough understanding of various embodiments of the invention, albeit the invention may be practiced through many embodiments other that those illustrated. Well-known logic and operations may not be set forth in detail in order to avoid unnecessarily obscuring this description. Moreover, the illustrated embodiments of the disclosure, and the description associated therewith, should be considered as examples of the principles of the invention and not intended to limit the disclosure to those specific embodiments. It should be understood that this disclosure covers all modifications, equivalents, and alternatives falling within the spirit and scope of the present disclosure.

General Network Architecture

Referring to FIG. 1, a general block diagram of a network 100 servicing multiple Basic Service Set Identifiers (BSSIDs) and supporting access to an external captive portal is shown. According to this embodiment of the disclosure, network 100 is a local area network (LAN) using captive portal for authentication. Such access control is adapted to provide security against a network device gaining unauthorized access to various network resources 150 (e.g., Internet, internal databases, etc.).

More specifically, captive portal authentication involves communications between (i) a network device (e.g., client device 110) seeking to utilize resources provided by network 100 and (ii) certain components forming network 100, namely network infrastructure 120 and an external captive portal 130 operating in a remotely located network device 140.

As illustrated, network infrastructure 120 is a collection of one or more network devices that are adapted to support communications between external captive portal 130 and client device 110. More specifically, network infrastructure 120 is adapted to initially restrict access to network resources 150 until the identity of client device 110 has been authenticated. According to one embodiment of the disclosure, such restriction may be accomplished by network infrastructure 120 returning a Hypertext Markup Language (HTML) document 170 in response to receipt of a Hypertext Transfer Protocol (HTTP) Request message 160 from client device 110 being in a non-authenticated state. The HTML document 170 is adapted to reference at least Uniform Resource Locators (URLs) for both external captive portal 130 and the targeted destination of HTTP Request message 160.

The network devices formulating network infrastructure 120 may vary, depending on the selected network architecture.

For instance, as shown in FIG. 2A, an exemplary embodiment of network 100 operating as a wireless local area network (WLAN) is shown. According to this embodiment of the disclosure, network infrastructure 120 comprises an access point (AP) 200 that virtualizes controller capabilities thereon. As an example, AP 200 (e.g., an Aruba® Instant™ AP) features a transparent HTTP proxy 210, which is adapted to intercept one or more incoming messages 220, such as HTTP Request message 160 of FIG. 1 (e.g., HTTP Get Request, HTTP Post Request, etc.), without requiring any special configuration of client device 110.

Upon detecting that incoming message 220 originated from client device 110 currently operating in a non-authenticated state (i.e. client device 110 has not been authenticated to access on network 100), AP 200 returns a message 230 (e.g., HTML document 170 of FIG. 1) to client device 110 in lieu of a HTTP Status Code redirect. Message 230 triggers client device 110, during operations to obtain content for its web browser, to establish communications with external captive portal 130 operating in a remote network device 140. According to one embodiment of the disclosure, message 230 is an HTML document such as a Frameset.

Generally, a "Frameset" is an HTML document that is responsible for dividing a browser window into rectangular areas. Some of these areas may be reserved for "frame elements". A "frame element" defines a rectangular area reserved for content (e.g. image, video clip, etc.) retrieved from a uniform resource locator (URL) assigned to that subspace. Herein, however, one of the frame elements includes an absolute URL for the external captive portal web login page that is accessed without user intervention as content is retrieved to populate those frame elements in accordance with the layout provided by Frameset.

Alternatively, as shown in FIG. 2B, where network 100 is a local area network (LAN) supporting wired connectivity with client device 110, network infrastructure 120 comprises a data transfer device 250, such as manageable switch (e.g. 802.1X switch, router, etc.) for example, that also is adapted with transparent HTTP proxy 210. Data transfer device 250 is adapted to intercept incoming messages 220, such as HTTP Request messages for example, without requiring any special client configuration.

Similar to as described above, after detecting that incoming message 220 originated from client device 110 that is in a non-authenticated state and is connected to data transfer device 250 over a wired interconnect 260, data transfer device 250 returns a message 270 (e.g., HTML document) to client device 110 in lieu of a HTTP Status Code redirect. Message 270 is an HTML document, such as a Frameset, where the operations conducted in response to receipt of message 270 are described above.

General Operations

As shown in FIG. 3, an exemplary sequence diagram of communications between client device 110, network infrastructure 120 (e.g. AP 200) and external captive portal 130 is shown. Herein, at time t0 300, client device 110 transmits a HTTP Request message 220 that is received by AP 200. Implemented with transparent HTTP proxy, AP 200 analyzes the HTTP Request message 220 to determine that this message originated from client device 110 being in a non-authenticated state.

Figure 4:
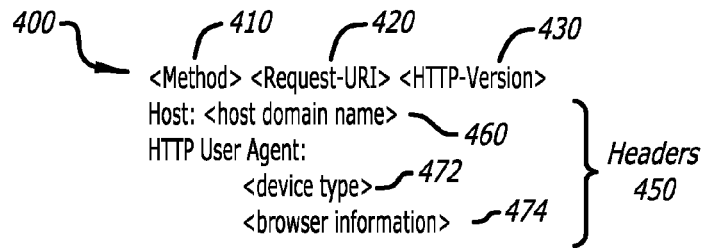
FIG. 4 is an exemplary embodiment of a Hypertext Transfer Protocol (HTTP) Request message transmitted from the client device of FIG. 1.

As shown in FIG. 4, an exemplary embodiment of HTTP Request message 220 is shown. HTTP Request message 220 comprises a plurality of information fields including, but not limited or restricted to (1) request line 400, and (2) one or more headers 450. Herein, request line 400 serves a number of purposes. More specifically, request line 400 indicates an action to be performed, specifies a resource upon which the action should be taken, and indicates to the network infrastructure (e.g., AP with transparent HTTP proxy) what version of HTTP protocol is being used by the client device. As illustrated in FIG. 4, the formal syntax for request line 400 includes the following elements:

<METHOD> <REQUEST-URI> <HTTP-VERSION>

METHOD element 410 identifies a type of action requested by client device 110 to be undertaken. There are a few standard methods defined in the HTTP/1.1 protocol, of which three are widely used: GET, HEAD and POST. In particular, as set forth in Request For Comment (RFC) 2616 entitled "Hyperlink Transfer Protocol-HTTP 1.1" (1999) incorporated herewith, a HTTP GET Request message is directed to retrieval of information identified by Request-URI 420.

REQUEST-URI element 420 is the uniform resource identifier (URI) for a resource to which the HTTP Request message applies. While URIs can theoretically refer to either uniform resource locators (URLs) or uniform resource names (URNs), URI is normally a HTTP URL that follows the standard syntax rules of Web URLs.

It is noted that the exact form of the HTTP URL may not be used in HTTP Request line 400. Instead, a path and/or file name may be included in HTTP Request line 400 while the host may be specifying in a Host header field 460 of HTTP Request message 220.

For example, suppose the user enters a URL such as this: http://www.arubanetworks.com/aruba-partners/

Since the "http:" is implied, the client device parses the remaining information so that REQUEST-URI element 420 constitutes "/aruba-partners/" while Host header field 460 contains "www.arubanetworks.com". Thus, the start of HTTP Request message 220 may be the following:

```
GET /aruba-partners/ HTTP/1.1
Host: www.arubanetworks.com
```

Host header field 460 (e.g. Host: <host name>:<port>) specifies the Internet host and port number of the resource being requested, as obtained from the original URI given by the user or referring resource. The Host field value <host name> represents the naming authority of the network device given by the original URL. Where host header field 460 is without any trailing port information, as shown above in HTTP Request message 220, this implies the default port for the service requested (e.g., "80" for a HTTP URL).

HTTP-VERSION element 430 identifies what HTTP version the source initiating the HTTP Request message is using in order to accurately interpret the message. For example, a HTTP Request message using HTTP version 1.0 will assume that a transitory connection is being used rather than a persistent one, and also, will avoid using HTTP version 1.1 headers in its reply.

Besides Host header 460 described above, a "HTTP User Agent" header 470 may be used to identify a source of the HTTP GET Request (e.g. client device 110). HTTP User Agent header 470 comprises a number of subfields including, but not limited or restricted to (i) device type and/or OS 472, (ii) browser information 474 (e.g., web browser type, version number, etc.), or the like.

Referring back to FIG. 3, once AP 200 determines that client device 110 is in a non-authenticated state at time t1 310, AP 200 returns message 230 (e.g., HTML document) to client device 110 in lieu of returning a HTTP Status Code redirect message. As described above, message 270 is an HTML document such as a frameset 500 as illustrated in FIG. 5.

Figure 5:
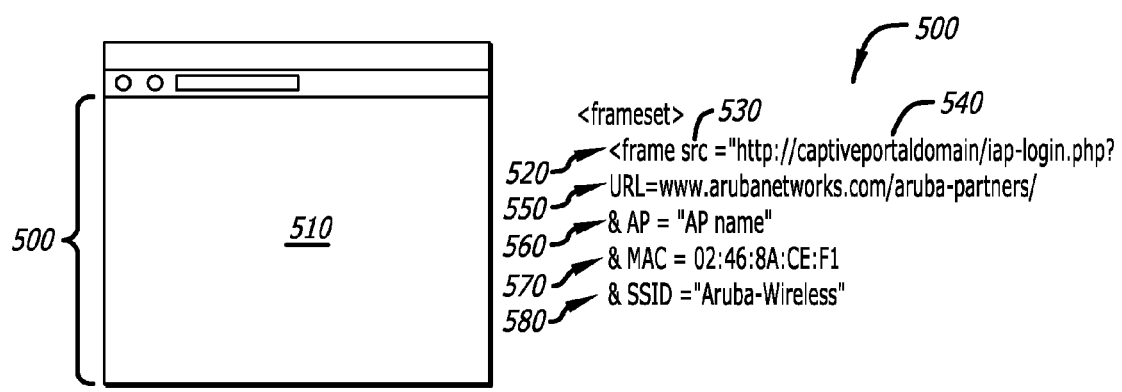
FIG. 5 is an exemplary embodiment of HTML document such as a frameset returned by a network device in response to receipt of the HTTP Request message from the client device is a non-authenticated state.

As shown in FIG. 5, frameset 500 is used to divide the browser window into one or more rectangular areas 510, where at least one of these areas corresponds to a frame element that features a hypertext link to the external captive portal. More specifically, upon review of its syntax, frameset 500 comprises a frame element 520 with a source attribute (src) 530 that normally specifies the location of contents to be contained in the frame element. However, in accordance with this disclosure, source attribute 530 provides an absolute URL 540 to the external captive portal so that the client device accesses the external captive portal in lieu of fetching content to be rendered in frame element 520.

It is contemplated that frameset 500 may include additional attributes. For instance, as illustrated by the syntax representation, frameset 500 comprises a URL 550 of the targeted destination device for the HTTP Request message through the combination of REQUEST-URI element 420 and Host header field 460 as shown in FIG. 4. Other additional information may be provided within frameset 500 including, but are not limited or restricted to (1) MAC address 560 of AP 200; AP name 570; Service Set Identifier (SSID) 580, or the like.

Returning back to FIG. 3, upon receiving the frameset, at time t2 320, client device 110 issues a login request message 325 to external captive portal 130 based on a source attribute contained within a frame element of the frameset. Login request message 325, upon receipt by external captive portal 130, causes return of a login page 335 to client device 110 at time t3 330.

According to one embodiment of the disclosure, login page 335 includes field entries to receive input from the user of client device 110. These entries may merely include an entry to acknowledge rules of conduct by users of the network or release of liability. According to another embodiment of the disclosure, login page 335 may include one or more modifiable fields for insertion of login information either by the user or automatically by client device 110 followed by selection of an ACCEPT button. As illustrative examples, the login information may be an alphanumeric value (code) shared between client device 110 and remote network 140 featuring external captive portal 130. Alternatively, the login information may be a username and password corresponding to client device 110.

It is contemplated that the ACCEPT button may be associated with hyperlink with a target "_top" attribute which causes the target of the form submission, namely the returned login page, to display at a top level of the browser window. In other words, the "top level" of the browser window constitutes replacing the entire frameset, not just the frame from which navigation control (ACCEPT button click) was launched.

Thereafter, after completion by user at t4 340, the login information 345 is routed to external captive portal 130. At this time, external captive portal 130 performs pre-authentication operations by checking whether the user credentials are recognized as valid credentials. This may be accomplished by external captive portal maintaining a list of user names and passwords that have been assigned by a network administrator and are still authorized. Of course, other mechanisms may be used for such access control operations.

At time t5 350, external captive portal 130 provides a login progress page 355 that identifies progress of the device login as well as an auto-submit form 357 that may be transmitted concurrently or subsequently from progress page 355. According to one embodiment of the invention, auto-submit form 357 is encoded within login process page 355 to cause client device 110 to automatically submit its user credentials 365 (e.g., username and password for authentication) to AP 200 for authentication at time t6 360. Additional parameters may be returned by external captive portal 130 for use in producing a displayable image while user authentication is requested by AP 200. These parameters may include information contained in one or more fields to identify an intended use of auto-submit form 357 (e.g. command field to identify authentication process will be conducted, login field to identify that user log in is being conducted, or the like).

Although not shown, auto-submit form 357 is an HTML document that includes a target attribute (target=_top) that identifies a loading position of a content that will be returned if the user credential automatically supplied by client device after receipt of auto-submit form 357 are authenticated. This further allows a URL bar located by the top of the browser window to be updated.

At t7 370, after AP performs an authentication process and confirms that client device 110 is authenticated and authorized to access network resources, AP 200 triggers an internal mechanism that alters the current operating state of client device 110 thereby permitting client device 110 to access network resources without triggering captive portal 130. Furthermore, at this time, AP 200 provides a success message 380 to client device 110 that prompts the user of a status change.

For instance, as illustrative examples, success message 380 may be an HTML web page that welcomes client device 110 and indicates that the user of such device is now permitted to access network resources such as the Internet. Alternatively, success message 380 may be a message that simply redirects the browser to a web page for the targeted destination such as "http://www.arubanetworks.com/aruba-partners/" in accordance with the illustrative example of the HTTP Get message of FIG. 4.

However, upon determining that client device 110 has failed to be authenticated, AP 200 returns a failure message 385 and access to network resources by client device 110 remains restricted. Thus, any subsequent HTTP Request messages from client device 110 will still trigger external captive portal 130 before access to a network resource can be granted.

Figure 6:
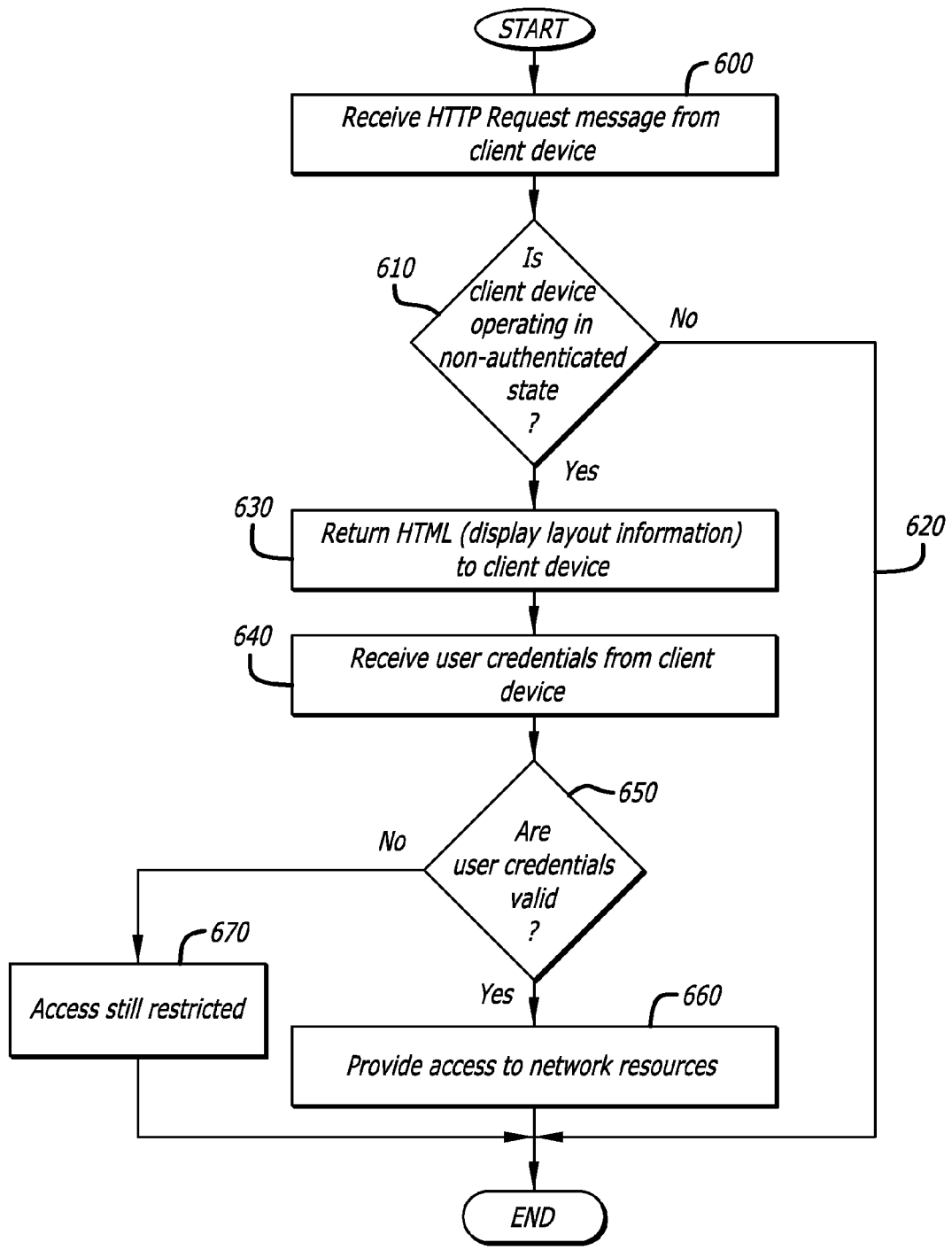
FIG. 6 is an exemplary embodiment of the operations performed by a network device to restrict access to network resources by a client device operating in a non-authenticated state thereby forcing the client device to communication with captive portal.

Referring now to FIG. 6, an exemplary embodiment of the operations performed by a network device to restrict access to network resources by a client device operating in a non-authenticated state thereby forcing the client device to communication with captive portal is shown. Herein, the network device with HTTP proxy functionality receives a HTTP Request message from a network device (block 600). For this HTTP Request message, a determination is made whether the source of the HTTP Request message, namely the client device, is operating in a non-authenticated state (block 610). If not, the client device is permitted access to resources provided by the network (block 620). However, if the client device is in a non-authenticated state, the network device returns a message including display layout information to the client device (block 630). According to one embodiment of the disclosure, display layout information may be a HTML document such as a "frameset," which comprises a frame element that provides linking to the external captive portal.

Thereafter, during the captive portal process, the network device receives user credentials for the client device (block 640). Such user credentials are provided based on an exchange of information between the client device and the external captive portal. In particular, after receipt of the frameset, the client device is forced to access the external captive portal, which performs login operations and acquires the user credentials that are routed to the network device at which time the frameset is effectively altered by use of a target attribute "top".

In the event that the user credentials are authenticated by AP, the client device is provided access to the network resources (blocks 650 and 660). Otherwise, the client device is not authenticated and access restrictions to network resources still apply (blocks 650 and 670).

Network Device Architecture

Figure 7:
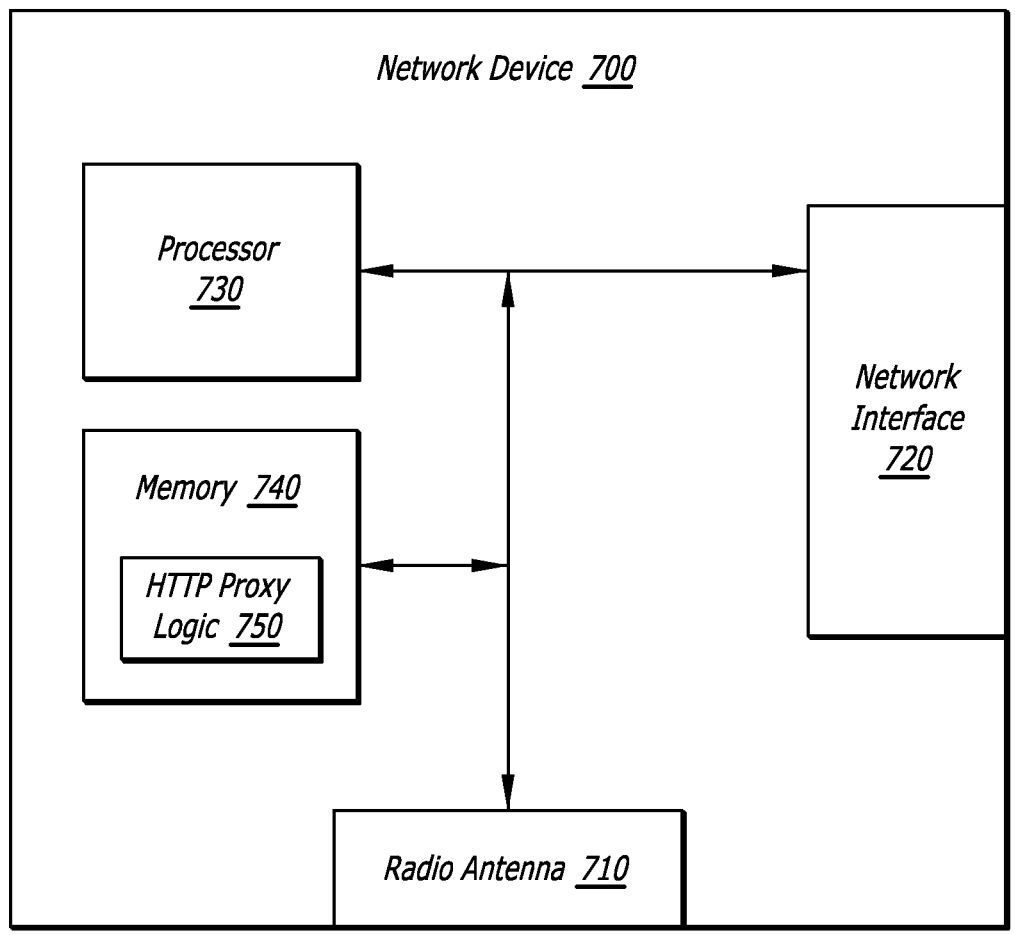
FIG. 7 is an exemplary embodiment of network device adapted to control access to network resources by returning display layout information that precludes an access requested network resources until after communications with an external captive portal have concluded.

Referring to FIG. 7, an exemplary embodiment of network device 200 adapted to control access to network resources by returning display layout information that precludes an access requested network resources until after communications with an external captive portal have concluded is shown. Operating as a node in network 100, network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data.

Moreover, network device 700 further includes a transparent HTTP proxy logic 750, which is coupled to processor 730 and memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc. In some embodiments, memory 740 stores one or more aggregated numbers of wireless client stations associated with one or more access points and/or controllers on one or more specific wireless communication channels.

HTTP proxy logic 750 receives an incoming HTTP Request message and determines if the client device initiating the HTTP Request message is authenticated. If not, the HTTP proxy message includes a frameset to the client device, where the frameset is adapted to prompt the client device to access an external captive portal. Thereafter, the external captive portal and client device have sufficient information to exchange information that prompts client device to forward its user credentials to network device 700 for authentication.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
    receiving, by a network device, a request message requesting access to a network resource, wherein the request message originates from a client device utilizing a browser window;
    determining that the request message is from a non-authenticated client device;
    generating a response message, wherein the response message includes an HTML frameset that specifies display layout information for the browser window, and wherein the display layout information includes a prompt to the client device to access a captive portal when retrieving content to populate the browser window; and
    returning the response message to the non-authenticated client device, wherein the response message facilitates displaying a hypertext link to the captive portal in the browser window of the client device, and wherein the HTML frameset in the response message facilitates connectivity between the non-authenticated client device and the captive portal, and wherein returning the response message is performed without reliance on a Hypertext Transfer Protocol (HTTP) Status Code redirect.

2. The computer-implemented method of claim 1, wherein the network device is an access point that is to provide a transparent HTTP proxy.

3. The computer-implemented method of claim 1, wherein the network device is an access point, and wherein the HTML frameset includes a media access control (MAC) address of the access point, a name of the access point, or a service set identifier (SSID) of the access point.

4. The computer-implemented method of claim 1, wherein the request message is a Hypertext Transfer Protocol (HTTP) Request message.

5. The computer-implemented method of claim 4, wherein the HTTP Request message is a HTTP GET Request message.

6. The computer-implemented method of claim 4, wherein the HTTP Request message is a HTTP POST Request message.

7. The computer-implemented method of claim 1, wherein the HTML frameset includes at least one frameset including a frame directed to an absolute Uniform Resource Locator (URL) of the captive portal.

8. The computer-implemented method of claim 1, wherein the HTML frameset includes at least one frameset including a frame directed to an absolute Uniform Resource Locator (URL) of the network resource.

9. A computer-implemented system, the system comprising:
    one or more processors;
    a display;
    an input device; and
    one or more non-transitory computer-readable storage mediums containing instructions to cause the one or more processors to:
    receive a request message requesting access to a network resource, wherein the request message originates from a client device utilizing a browser window;
    determine that the request message is from a non-authenticated client device;
    generate a response message, wherein the response message includes an HTML frameset that specifies display layout information for the browser window, and wherein the display layout information includes a prompt to the client device to access a captive portal when retrieving content to populate the browser window; and
    return the response message to the non-authenticated client device, wherein the response message facilitates displaying a hypertext link to the captive portal in the browser window of the client device, and wherein the HTML frameset in the response message facilitates connectivity between the non-authenticated client device and the captive portal, and wherein returning the response message is performed without reliance on a Hypertext Transfer Protocol (HTTP) Status Code redirect.

10. The computer-implemented system of claim 9, wherein the request message is received by an access point that is to provide a transparent HTTP proxy.

11. The computer-implemented system of claim 9, wherein the request message is received by an access point, and wherein the HTML frameset includes a media access control (MAC) address of the access point, a name of the access point, or a service set identifier (SSID) of the access point.

12. The computer-implemented system of claim 9, wherein the request message is a Hypertext Transfer Protocol (HTTP) Request message.

13. The computer-implemented system of claim 12, wherein the HTTP Request message is a HTTP GET Request message.

14. The computer-implemented system of claim 12, wherein the HTTP Request message is a HTTP POST Request message.

15. The computer-implemented system of claim 9, wherein the HTML frameset includes at least one frameset including a frame directed to an absolute Uniform Resource Locator (URL) of the captive portal.

16. The computer-implemented system of claim 9, wherein the HTML frameset includes at least one frameset including a frame directed to an absolute Uniform Resource Locator (URL) of the network resource.

17. A non-transitory machine-readable storage medium, on which is stored instructions to cause a data processing apparatus to:
    receive a request message requesting access to a network resource, wherein the request message originates from a client device utilizing a browser window;
    determine that the request message is from a non-authenticated client device;
    generate a response message, wherein the response message includes an HTML frameset that specifies display layout information for the browser window, and wherein the display layout information includes a prompt to the client device to access a captive portal when retrieving content to populate the browser window; and
    return the response message to the non-authenticated client device, wherein the response message facilitates displaying a hypertext link to the captive portal in the browse window of the client device, and wherein the HTML frameset in the response message facilitates connectivity between the non-authenticated client device and the captive portal, and wherein returning the response message is performed without reliance on a Hypertext Transfer Protocol (HTTP) Status Code redirect.

18. The non-transitory machine-readable storage medium of claim 17, wherein the network device is an access point that is to provide a transparent HTTP proxy.

19. The non-transitory machine-readable storage medium of claim 17, wherein the network device is an access point, and wherein the HTML frameset includes a media access control (MAC) address of the access point, a name of the access point, or a service set identifier (SSID) of the access point.

20. The non-transitory machine-readable storage medium of claim 17, wherein the request message is a Hypertext Transfer Protocol (HTTP) Request message.

21. The non-transitory machine-readable storage medium of claim 20, wherein the HTTP Request message is a HTTP GET Request message.

22. The non-transitory machine-readable storage medium of claim 20, wherein the HTTP Request message is a HTTP POST Request message.

23. The non-transitory machine-readable storage medium of claim 17, wherein the HTML frameset includes at least one frameset including a frame directed to an absolute Uniform Resource Locator (URL) of the captive portal.

24. The non-transitory machine-readable storage medium of claim 17, wherein the HTML frameset includes at least one frameset including a frame directed to an absolute Uniform Resource Locator (URL) of the network resource.

* * * * *